Aug. 19, 1941.      C. WACHTEL        2,252,998
SAFETY SWING
Filed Aug. 15, 1940      2 Sheets-Sheet 2
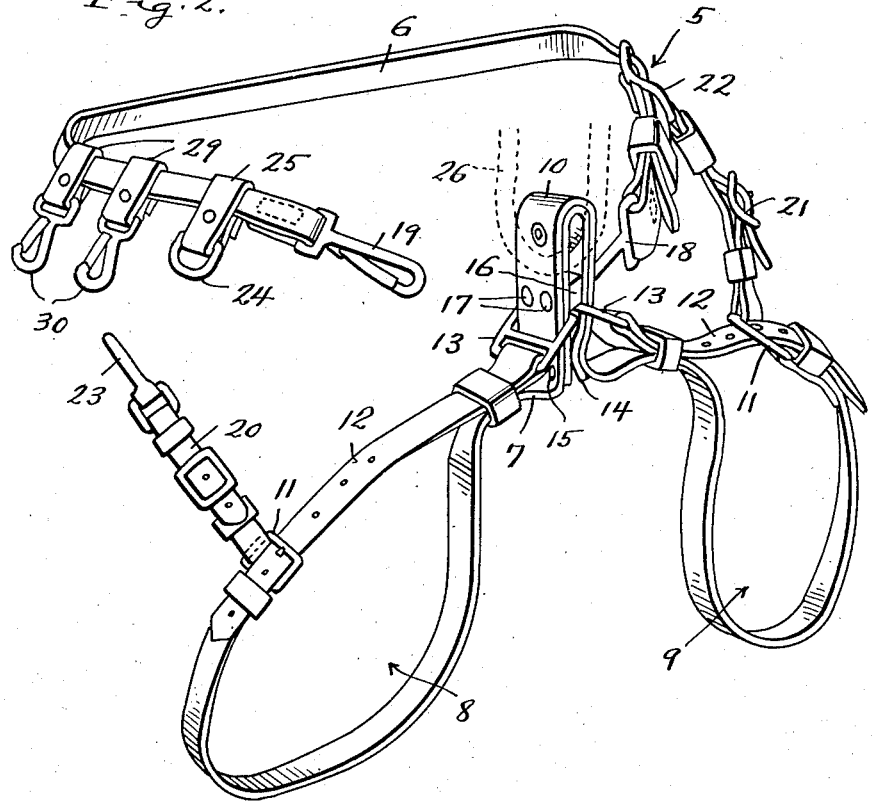
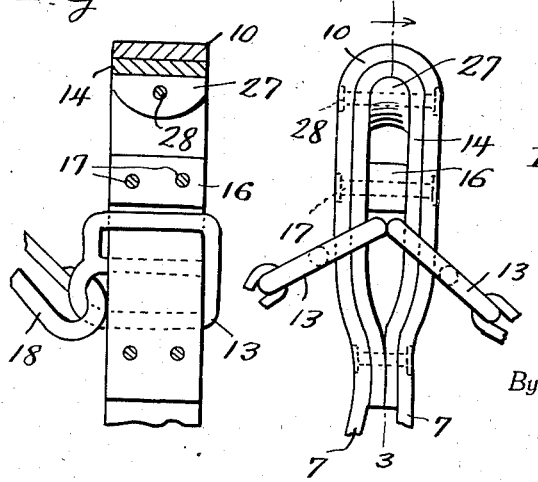
Inventor
Clarence Wachtel
By Clarence A. O'Brien
Attorneys Patented Aug. 19, 1941

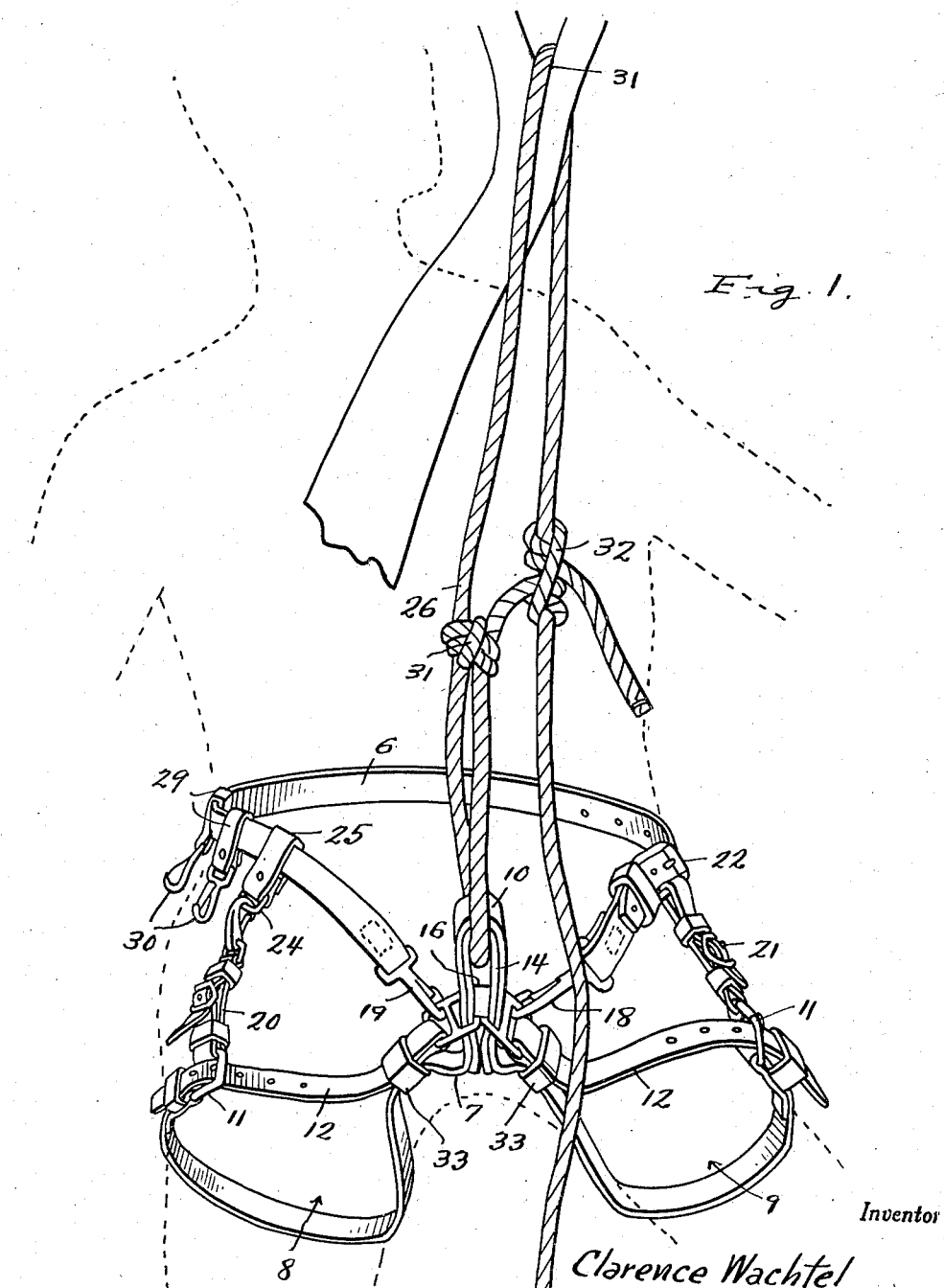

2,252,998

UNITED STATES PATENT OFFICE 2,252,998

SAFETY SWING

Clarence Wachtel, Wauwatosa, Wis.

Application August 15, 1940, Serial No. 352,819

3 Claims. (Cl. 227—49)

This invention relates to what is known in the art as a climber's swing, the same to be used by climbers when using a swing rope and taut line hitch.

More particularly an object of the invention is to provide a device of this character especially designed for use in the nursery and tree surgery business to facilitate climbing, by the tree surgeon of trees as is often required, and to render safer this required duty of the tree surgeon.

At the present time it is the practice of tree surgeons and those similarly employed to raise and lower themselves in trees through the medium of a rope. In accordance with the present invention a device referred to herein as a "swing" is provided for use with such rope and so equipped as to be attached to the body of the climber in a manner not to interfere with the freedom of movement of the climber but at the same time render safer the raising and lowering of one's self by use of the rope as is now commonly resorted to for such purposes.

The invention together with its objects and advantages will be best understood from a study of the following description taken in connection with the accompanying drawings wherein—

Figure 1 is a perspective view illustrating the application and use of the invention.

Figure 2 is a perspective view of the swing ready for use.

Figure 3 is a detail sectional view taken substantially on the line 3—3 of Figure 4, and Figure 4 is a detail elevational view of a shank portion of the invention and forming a very salient feature thereof.

Referring more in detail to the drawings it will be seen that the swing, indicated generally by the reference numeral 5, in the preferred embodiment thereof, embodies an adjustable body-encircling belt 6 and a belt 7 formed into a pair of leg-accommodating loops 8 and 9 and a shank 10 intermediate said loops.

To form the leg-accommodating loops 8 and 9 and the shank 10, the belt 7 intermediate its ends is first bent into a substantial U to provide the shank 10, and the free ends of the strap 7 have buckle connections 11 with strap sections 12 that at one end are suitably fastened to metallic loops or frames 13 that engage the legs of the shank 10.

The shank 10 is relatively rigid and has the interior thereof lined with a length of leather 14 as shown.

The sides of the shank 10 at the point of merger with the leg loops 9 are riveted or otherwise secured together as at 15 and the loops or frames 13 are confined between this closed end of the shank 10 and a combination rope guide and spacer block 16 riveted or otherwise secured between the sides of the shank 10 as at 17.

The adjustable waist-encircling belt 6 is provided at its respective opposite ends with snap fasteners 18 and 19, respectively. The snap fastener 18 engages the loop or frame 13 at one side of the shank 10, while the snap fastener 19 engages the loop or frame 13 at the opposite side of the shank when the device is being worn.

To support the loops 8 and 9 from the belt 6 and to prevent the leg loops from slipping down the sides of the person and causing uncomfortable binding at the back of the thighs, there are provided adjustable side straps 20 and 21, respectively, the straps being engaged at one end with the buckles 11 and at an opposite end thereof one of the side straps, in the present instance the strap 21, is engaged with the buckle 22 of the belt 6 as shown, while the side strap 20 at its free end is provided with a snap fastener 23 that is engageable with a keeper loop 24 slidably associated with the belt 6 as at 25.

The shank 10 is adapted to have trained therethrough, as shown, and in a manner hereinafter more fully explained, one end of the swing rope 26, and this rope is trained through the shank 10 between the aforementioned combination rope guide and spacer block 16 and a rope guide block 27 securely fastened in the upper end of the shank 10 by a rivet or other suitable fastening means 28. In this connection it will be noted that the guide block 27 is substantially segmental in shape, having a convex grooved edge against which the rope bears. By having the block so shaped and constructed the rope will slide easily through the shank 10, and being so guided by the block will be prevented from making sharp corner bends which would tend to over-strain the outside fibres of the rope resulting in a break occurring in the rope eventually.

Also, in accordance with the present invention, the waist-encircling belt 6 has slidably associated therewith, as at 29, one or more snap hooks 30 as and for a purpose hereinafter made manifest.

In using the swing the legs are first passed through the loops 8 and 9 after which the belt 6 is passed around the waist of the user and the snap fastener 19 engaged with the proper loop or frame 13, while snap fastener 23 is engaged with its keeper loop 24; the device fitting the body as shown in Figure 1.

With the device thus applied to the body, the free end of the swing rope 26 is engaged with a selected one of the snap fasteners 30. The user then raises or lowers himself to the desired position in the tree and when that position or designation is reached the said end of the swing rope 26 is removed from the snap fastener 30 and passed through a tackle block or, as shown in Figure 1, a fork 31 in a limb of the tree, and then threaded through the shank 10 between the guide blocks 16 and 27. The end of the rope is then passed upwardly and a bowline knot or two half-hitches 31 is made in the rope after which the taut line hitch 32 is tied. Thus in this manner is the swing securely fastened to the swing rope and permits the user to swing from the rope giving the user complete freedom of movement with complete safety to the user.

Also in accordance with the invention there are associated with the leg-accommodating loop-forming strap 7 slides 33 which serve to maintain the desired loop formations 8 and 9 thus preventing discomfort to the user at the crotch.

It is thought that a clear understanding of the construction, manner of applying and using a swing embodying the features of the present invention, and the advantages of such a swing will be had by those skilled in the art without a more detailed description thereof.

It is also to be understood that while I have herein shown and described a preferred embodiment of the invention, it is not intended to unduly restrict the invention to the precise details herein illustrated and described; but that I claim all such forms of the invention to which I am entitled and as come within the scope of the claims hereunto appended.

Having thus described the invention what is claimed as new is:

1. A climber swing in the form of a harness embodying connected leg-accommodating loops and a waist-encircling belt, together with a shank at the point of connection between said loops and belt; said shank being in the form of a loop and adapted to have a swing rope trained therethrough for connecting the swing with such rope, and means on the waist-encircling belt for detachably connecting the free end of a swing rope thereto to facilitate the carrying of said end of the rope by the climber to the point where the threading of the end of the rope through said shank and the making of the hitch for positively securing the swing to the swing rope is desired.

2. A swing for use in climbing trees and the like comprising a suspension strap provided intermediate the ends thereof with a looped portion having the sides thereof connected together and forming an upstanding shank adapted for training a suspension rope therethrough, a pair of short straps connected to and extending oppositely from opposite sides of said shank, respectively, said short straps being adjustably secured at outer ends thereof to the ends of the suspension strap and forming with the latter a pair of adjustable leg supporting loops upon opposite sides of said shank, respectively, the connections between the short straps and shank comprising links through which the sides of the shank are extended, and a waist belt having means on the ends thereof for attachment of said ends to said links.

3. A swing for use in climbing trees and the like comprising a suspension strap provided intermediate the ends thereof with a looped portion having the sides thereof connected together and forming an upstanding shank adapted for training a suspension rope therethrough, a pair of short straps connected to and extending oppositely from opposite sides of said shank, respectively, said short straps being adjustably secured at outer ends thereof to the ends of the suspension strap and forming with the latter a pair of adjustable leg supporting loops upon opposite sides of said shank, respectively, the connections between the short straps and shank comprising links through which the sides of the shank are extended, a waist belt having means on the ends thereof for attachment of said ends to said links, and a pair of side straps connecting the short straps to said belt upon opposite sides of the waist, respectively.

CLARENCE WACHTEL.